United States Patent
Warkentin et al.

(10) Patent No.: US 11,182,303 B2
(45) Date of Patent: Nov. 23, 2021

(54) CONSTRUCTING BOOTLOADER ADDRESS SPACE WITHOUT GUARANTEED PHYSICAL MEMORY LAYOUT

(71) Applicant: VMware, Inc., Palo Alto, CA (US)

(72) Inventors: Andrei Warkentin, Cambridge, MA (US); Cyrien Laplace, Cambridge, MA (US); Alexander Fainkichen, Southborough, MA (US); Ye Li, Newton, MA (US); Regis Duchesne, Monts-de-Corsier (CH)

(73) Assignee: VMware, Inc., Palo Alto, CA (US)

(*) Notice: Subject to any disclaimer, the term of this patent is extended or adjusted under 35 U.S.C. 154(b) by 778 days.

(21) Appl. No.: 15/387,332

(22) Filed: Dec. 21, 2016

(65) Prior Publication Data
US 2018/0173539 A1 Jun. 21, 2018

(51) Int. Cl.
*G06F 12/1009* (2016.01)
*G06F 9/4401* (2018.01)
*G06F 12/14* (2006.01)
*G06F 12/109* (2016.01)

(52) U.S. Cl.
CPC ........ *G06F 12/1009* (2013.01); *G06F 9/4401* (2013.01); *G06F 12/109* (2013.01); *G06F 12/1441* (2013.01); *G06F 2212/1008* (2013.01); *G06F 2212/657* (2013.01)

(58) Field of Classification Search
None
See application file for complete search history.

(56) References Cited

U.S. PATENT DOCUMENTS

| 7,680,919 | B2 | 3/2010 | Nelson | |
|---|---|---|---|---|
| 9,383,935 | B1 | 7/2016 | Warkentin et al. | |
| 2015/0134945 | A1* | 5/2015 | Takami | G06F 9/4401 713/2 |
| 2016/0048459 | A1* | 2/2016 | Oh | G06F 12/145 711/103 |
| 2016/0132369 | A1* | 5/2016 | Lee | G06F 1/3296 713/2 |
| 2016/0170679 | A1* | 6/2016 | Warkentin | G06F 3/0632 711/203 |

* cited by examiner

*Primary Examiner* — Danny Chan (57) ABSTRACT

Examples construct a bootloader address space using a page fault exception. A bootloader executing in machine address (MA) space determines the MA at which the bootloader has been loaded into memory. The bootloader calculates a difference between an expected virtual address (VA) and the loaded MA. The bootloader defines a page table mapping the bootloader MA to an expected VA, and sets an exception handling vector to point to the expected VA. When a memory management unit (MMU) utilizing the defined page table for address translation is enabled, a page fault exception occurs. The page fault exception handling resumes execution of the bootloader at the expected VA via an exception handling vector pointing thereto.

20 Claims, 6 Drawing Sheets

CONSTRUCTING BOOTLOADER ADDRESS SPACE WITHOUT GUARANTEED PHYSICAL MEMORY LAYOUT

BACKGROUND

Bootloader code typically executes between early computing system hardware initialization and operating system (OS) kernel control. The bootloader transitions a system to the OS environment. Some bootloaders place the central processing unit (CPU) into the correct mode of operation prior to hand off to the operating system kernel, which includes enabling the memory management unit (MMU) and constructing the early kernel address space. Bootloaders frequently leverage assumptions to make these tasks simpler. For example, some bootloaders are linked and loaded at a certain fixed address selected to enable the bootloader to be mapped at a base virtual address (VA) equivalent to a base machine address (MA) without conflicting with loaded kernel components and/or other data structures within the same address space.

Many computer system platforms do not provide guaranteed memory locations, do not have low memory addresses, and/or may have memory at extremely high addresses. A bootloader linked to a certain address may be non-loadable on a machine without random access memory (RAM) at the linked address. Some bootloaders employ position independent code (PIC) with embedded relocations to adapt to whatever address the bootloader is loaded. Other bootloaders relocate themselves to the loaded address. However, these bootloaders need to know where the move goes and rely on platform knowledge which may be unavailable.

Moreover, these solutions are sometimes complex to implement and suffer from potential address collisions where there is little or no control over the linked and/or loaded addresses. Collisions may occur where the bootloader code runs with VA equal to the MA if the bootloader expects some part of the VA space to be available. This property may be violated resulting in collisions and other issues.

SUMMARY

Examples of the disclosure provide for constructing bootloader address space corresponding to an expected base virtual address (VA). A bootloader determines a machine address (MA) at which a bootloader has been loaded into memory. A difference between an expected virtual address (VA) and a loaded MA is determined. A page table, mapping the loaded MA to an expected VA, is defined based on the determined difference. An exception handling vector is set to point to the expected VA associated with the bootloader. A memory management unit (MMU) which uses the defined page table for address translation is enabled. In response to a page fault exception resulting from enabling the MMU, the bootloader is executed at the expected VA via the exception handling vector.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure construct a virtual address space for a bootloader. The bootloader, in some examples, initializes an operating system, a hypervisor, a guest operating system (OS) on a virtual computing instance (VCI), or other software component. Other examples provide an initial bootloader which utilizes an exception generated by a memory management unit (MMU) to switch from executing the bootloader in an unmapped or identity mapped machine address (MA) space to executing the bootloader in a bootloader address space. The MA is an address in physical memory. The MA may also be referred to as a physical address (PA).

In some examples, the MA space is address space associated with the initial loaded MA. The bootloader address space is virtual address (VA) space associated with an expected base VA in virtual memory in an MMU enabled environment. This is accomplished without forcing identity mapping of the loaded MA and expected base VA to ensure proper execution of the bootloader in the expected virtual memory address space.

Some examples provide an initial bootloader portion to configure the page fault handler and page tables prior to enabling the MMU address translation. In these examples, the initial bootloader portion is executing in an unmapped space. The initial bootloader portion enables the MMU to trigger a page fault. The resulting page fault resumes execution of a second portion of the bootloader in virtual memory through a redirect via an exception handling vector. This reduces boot failures and improves portability of the bootloader across varying architectures and platforms.

In other examples, the bootloader modifies exception handling and ensures certain code alignments and size criteria to ensure mappings of the desired VA to the current MA is equivalent such that the current VA maps to the current MA or they are completely disjointed such that no overlaps occur. This property ensures that once the MMU is enabled or reinitialized and the translation lookaside buffer (TLB) is flushed, the bootloader continues execution as if nothing happened where the expected VA happens to coincide with the current MA or execution continues at the next expected instruction within the current VA via a page fault exception.

The page fault enables bootloader execution to switch from an MMU disabled environment in which the bootloader runs in the unmapped MA space to the MMU enabled environment in which the bootloader runs in the VA space without using intermediate steps, such as identity mapping, code relocations, etc. Identity mapping refers to forcing the VA to equal the MA.

In some examples, the bootloader utilizes exception handling to run the bootloader linked at a known VA in a variety of systems without forced identity mapping and without guaranteed memory layout. The disclosure enables the bootloader to switch from executing in a MA space to a VA space without relying on identity mapping, embedded relocations, or memory reservations. In this manner, the bootloader initializes a hypervisor, OS, or other software without utilizing identity mapping and with reduced error rate. This decoupling of the virtual and physical memory mapping enables the bootloader to be loaded at arbitrary locations for varying platform implementations while avoiding conflicts between the machine addresses of the bootloader and the virtual addresses of the OS kernel core and data structures.

While some embodiments are described as referencing VMs for clarity of description, the disclosure is operable with any form of VCIs. A VCI may be a VM, a container, and/or any other type of virtualized computing instance.

Figure 1:
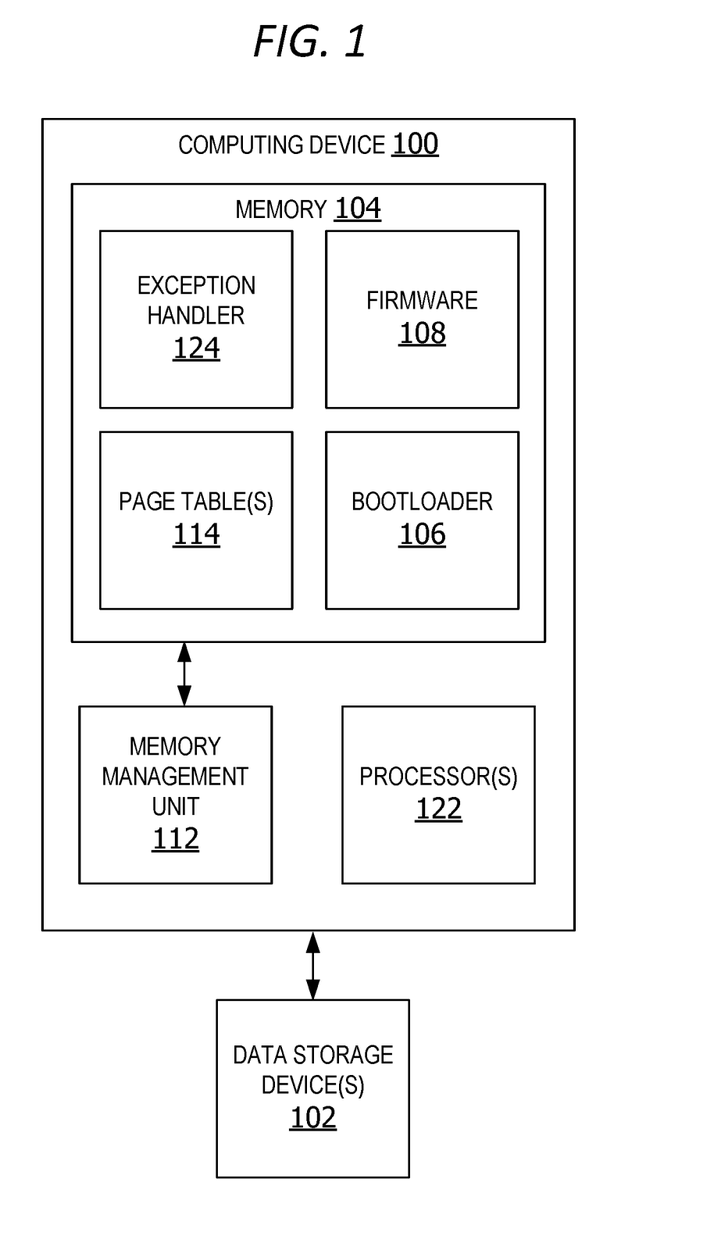
FIG. 1 is an exemplary block diagram illustrating a system for constructing bootloader address space.

Referring to FIG. 1, an exemplary block diagram illustrating a system for constructing bootloader address space. Address space refers to a range of discrete addresses in memory. In a computer having an operating system managing the computer hardware, there is a machine address space and multiple virtual address spaces. The machine address space refers to addresses provided by the physical hardware such as physical memory 104 (such as, but not limited to, the random-access memory (RAM) or dynamic RAM (DRAM) and other hardware devices. Virtual addresses are provided, by an operating system managing the computer, to applications/processes running in the operating system. There may be one virtual address space per process. Applications/processes address the memory using virtual addresses (VAs), which are then mapped to machine addresses (MAs) to address the physical memory.

In the example of FIG. 1, the computing device represents a system for loading and executing a bootloader in a VA space. The computing device represents any device executing instructions (e.g., as application programs, operating system functionality, or both) to implement the operations and functionality associated with the computing device.

The computing device 100 may include a single computing device, as well as two or more computing devices in a cluster. In some examples, the computing device is a server associated with a rack scale architecture (RSA) housing a plurality of physical servers in a cluster. In yet other examples, the computing device 100 includes one or more blade servers. In still other examples, the computing device 100 is implemented as a VMware vSphere cluster from VMware, Inc.

In some examples, the computing device 100 includes an operating system (OS), hypervisor, guest OS, or other software component that is loaded from persistent memory, such as data storage device(s) 102, into memory 104 by a bootloader 106. The data storage device(s) 102 in this non-limiting example includes one or more persistent data storage devices.

The data storage device(s) 102 may be implemented as any type of data storage, including, but without limitation, a hard disk, optical disk, a redundant array of independent disks (RAID), a solid-state drive (SSD), a flash memory drive, a storage area network (SAN), or any other type of data storage device. The data storage device(s) may include rotational storage, such as a disk. The data storage device(s) may also include non-rotational storage media, such as SSD or flash memory. In some non-limiting examples, the data storage device(s) provide a shared data store accessible by two or more hosts in a cluster.

The computing device 100 may not provide a guaranteed memory layout. As such, the bootloader 106 cannot make assumptions regarding the MA at which the bootloader 106 will be loaded into memory 104 because memory locations for the bootloader are not guaranteed by memory layout, specification, or other industry practice.

The computing device further has one or more computer readable media, such as the memory 104. The memory 104 includes any quantity of media associated with or accessible by the computing device 100. The memory 104 may be internal to the computing device 100 (as shown in FIG. 1), external to the computing device (not shown), or both (not shown).

The memory 104 is any device allowing information, such as, but not limited to, executable instructions, to be stored and retrieved. The memory 104 may be implemented as any type of RAM. The memory in some examples is part of a shared memory architecture. In other examples, the memory optionally includes one or more cache(s).

In some examples, the memory 104 includes one or more random access memory (RAM) modules. The RAM may include dynamic RAM (DRAM). The memory 104 may also include read-only memory (ROM).

The address space of the memory 104 is partitioned into pages (for example, in Intel x86 architecture) or regions (for example, Intel IA-64 architecture). Applications address the memory 104 using virtual addresses (VAs), which include virtual page numbers (VPN)s. The VAs are then mapped to machine addresses (MAs) that are used to address the physical memory 104. The VAs and MAs have a common offset from a base address such that only the VPN is converted into a corresponding physical page number (PPN).

A VA is translated or mapped to a MA to determine which page of the hardware memory is intended. The MMU 112 is a hardware component for performing this address translation.

During early bootloader execution, the MMU 112 is disabled. An MMU 112 is disabled if it is turned off, the MMU address translation function is disabled or bypassed, or the MMU is on and configured to identity map. In other words, an MMU 112 is disabled if it is not performing address translation or it is turned on with identity mapping.

Address translation refers to translating from a VA to a MA. Virtual memory translation is not performed when the MMU 112 is disabled. Further, VAs identity map to MAs when the MMU 112 is disabled. In some examples, the MMU 112 may be switched on or off via a value in a register.

The memory stores a bootloader 106 for loading an OS, hypervisor, or another software component(s). With the disclosure, the bootloader configures the exception handler to trigger a page fault exception with the MMU 112 enabled such that the execution of the bootloader switches from the MA space to the VA space without identity mapping. The MMU 112 may be enabled by turning the MMU "on."

The MMU 112 may be enabled and disabled (activated and inactivated) using any known or available method for enabling address translation. In some examples, a system control register may include a "MMU enable" bit that is set to enable VA address translation. The bit may be cleared to disable translation.

In an example, the bootloader is an early stage loader for transitioning bootloader execution from the loaded MA range into the expected VA range. The expected base VA is a pre-determined VA. The bootloader is linked at the expected base VA. The expected base VA in some examples is determined by a user when the user builds the bootloader.

The expected base VA is selected to avoid overlapping bootloader virtual addresses with the virtual address of other components and data structures to prevent collisions.

The loaded MA is the MA at which the bootloader is initially loaded into physical memory. The loaded MA is unknown to the bootloader prior to the bootloader being loaded into memory by the firmware.

The memory 104 further stores one or more computer-executable components. Exemplary components include an exception handler 124, one or more page table(s) 114, and a firmware 108. In some non-limiting examples the firmware 108 includes a basic input/output system (BIOS). The firmware may be stored in ROM.

In some systems, such as systems having x86 architectures, bootloaders typically have low MAs, such as addresses below 4 gigabytes (4 GB) while kernel components have high addresses. Other systems include memory reservations. For example, in some systems, the bootloader code is typically located in memory below one megabyte (MB). This area of memory is usually reserved and does not include MAs for OS kernel code or other data structures. In these cases, a bootloader can make assumptions regarding the location in memory at which the bootloader may be loaded by the firmware to force identity mappings during MMU initialization.

Moreover, many systems, such as, but not limited to, Advanced reduced instruction set (RISC) machine, do not provide guaranteed memory layouts and/or memory reservations for bootloaders, OS kernel, etc. The memory in these systems may be located at arbitrary locations for varying platform implementations. Consequently, ensuring that an address for both the MA and the VA of the bootloader does not match a VA that corresponds to valid kernel code or other data may be difficult or impossible. Moreover, the bootloader cannot make assumptions or predictions regarding which virtual memory addresses may be required by the kernel OS or other data structures.

For example, the MAs within the physical memory range the bootloader is loaded into may numerically overlap one or more VAs required for handoff to the OS kernel. If the MA for the bootloader code overlaps with a VA that corresponds to valid kernel code or other data, then the execution flow of the bootloader unintentionally diverts to this non-bootloader code or data when the MMU is activated. This may cause errors and/or boot failure.

In this example, the bootloader is loaded into memory 104 by the firmware 108 at a base MA which is unknown to the bootloader 106 prior to loading.

After loading in memory, the bootloader obtains the loaded MA address where the bootloader is linked and loaded in physical memory. In some non-limiting examples, the bootloader 106 is linked by a toolchain and loaded into memory 104 by the firmware 108 or an earlier boot stage.

The loaded MA in some examples is the base MA for a range of MAs at which the bootloader 106 is located. The loaded MA is not mapped by a VA. The address space associated with the loaded MA may be referred to as the MA space. The MA space is an unmapped address space in physical memory. The MA space may be implemented as any machine addresses within the memory 104 at which the bootloader is loaded by the firmware or other entity responsible for moving the bootloader code from nonvolatile memory into volatile memory 104.

One or more processor(s) 122 executes the bootloader code within the MA space. At this initial stage, the MMU 112 may be disabled. The disabled MMU may be turned "off" or the MMU may be configured to identity map such that MA is equivalent to VA (1:1) mode when the firmware hands off to the bootloader.

The loaded MA in the machine address space is identity map or equivalent to the VA (MA=VA). The processor(s) 122 include any quantity of processing units programmed to execute computer executable program code for implementing aspects of the examples. In this non-limiting example, the processor(s) 122 include one or more ARM 64 processors.

The computer executable program code, such as bootloader code, may be performed by the processor(s) 122, by multiple processors within the computing device 100, or performed by a processor external to the computing device 100. In some examples, the processor(s) 122 is programmed to execute computer executable program code such as those illustrated in the figures (e.g., FIG. 4 and FIG. 5).

In some examples, the processor(s) 122 represent an implementation of analog techniques to perform the operations described herein. For example, the operations may be performed by an analog computing device and/or a digital computing device.

In an example, the MMU 112 is disabled. The MMU 112 in this example is disabled because the MMU is "off" Therefore, during execution of this initial portion of the bootloader 106, the bootloader code MAs are equal to the VAs. This identity mapping may be referred to as 1:1, in which the value of the VA is the same as the value of the MA in the mapping.

When the MMU 112 is enabled, translation of addresses will be performed by the MMU 112 using the page tables. If the MA equals the VA, the bootloader continues executing after enabling the MMU because the addresses are identity mapped. In other words, if an instruction MA is the same as the VA, the instruction is located at the same addresses irrespective of the MMU state.

If the MMU is activated and the next executing VA does not match expected (and mapped) VA, a page fault exception will be taken due to an unmapped address being fetched from. The page fault handler code, residing at expected VAs, can then redirect execution to continue booting.

In this example, the bootloader 106, when executed by the processor(s) 122 of the computing device 100, causes the processor(s) 122 to obtain the loaded MA of the bootloader. In some examples, the bootloader utilizes computer-relative instructions to obtain the loaded MA address. The expected VA base has the same alignment as the loaded MA. The size of the bootloader is less than or equal to the alignment value.

The bootloader compares the loaded MA against alignment guarantees. Alignment refers to an offset for memory addresses. Addresses with a matching alignment have the same offset. An alignment of 4 bytes means an address is divisible by a 4-byte integer value. For example, an aligned address may include 0x2000 or 0x2004 but not 0x2001 because the offset is not divisible by the alignment value.

The bootloader checks alignment and size criteria. The alignment criteria specify that an alignment of the loaded MA matches an alignment of the expected base VA for the bootloader. If the alignments do not match, the boot fails.

The size criteria specify that a size of the bootloader is less than or equal to the alignment. If the bootloader size is greater than the alignment value, the boot fails. These alignment and size criteria guarantee at least a certain alignment with the expected base VA.

In some examples, if the attempted boot fails, an error message or other notification is provided to a user via an output device, such as a display screen, email, audio warning, text message, or other output.

The bootloader calculates a VA addend. The VA addend is the difference between the expected base VA and the loaded MA of the bootloader. The VA addend value is stored in a variable for later use. In some examples, this value is utilized to convert between the bootloader's VAs and actual MAs where the bootloader is loaded. In other words, a VA of the bootloader in the virtual address space is converted to a MA using the VA addend value.

The bootloader defines one or more page tables 114 mapping the bootloader code. In some examples, the bootloader creates the page table(s) 114. In other examples, the bootloader modifies one or more page tables to create the page table(s) 114. The modification may include adding a mapping from the expected VA to the loaded MA.

In this example, the addresses described in the page tables 114 do not have overlapping MA and VA ranges due to the alignment and size checks. In other examples, the MA and VA are equivalent (where MA=VA).

The bootloader sets the exception handler 124 to resume execution of the bootloader 106 within the VA space upon occurrence of a page fault exception. The exception handler address is within the expected VAs mapped with the MMU on. In some examples, the exception handler 124 exception handling vector is set to resume execution at the expected VA for code associated with the remaining portion of bootloader 106 that has not yet been executed by the processor(s) 122.

In some examples, the bootloader 106 points the page fault exception handling vector to the remainder of the initialization code with the MMU enabled. The page fault exception handling vector may be pointed to the remaining bootloader code via a special register, such as, but not limited to, VBAR on ARM 64 architectures.

The bootloader 106 enables the MMU 112, which attempts to map the VA address which triggers a page fault exception. This initiates exception handling. The exception handler 124 exception handling vector points to the bootloader code which resumes execution of the remaining bootloader code at the expected VA within the VA space in virtual memory.

In some examples, the bootloader restores the exception handling vector to point to the exception handling code after the page fault exception resumes the execution of the bootloader in VA space.

In this manner, the bootloader 106 utilizes the exception handler to switch execution of the bootloader from the MA space to the bootloader address space associated with the expected base VA without moving the bootloader code in the physical memory. In other words, the bootloader maps the expected VA to the current MA such that the bootloader runs at the desired VA addresses following a page fault. The current MA may be the loaded MA. This enables the position dependent portion of the bootloader code to behave in an almost position independent manner regarding the loaded MA of the bootloader.

Thus, in a situation in which the expected VA is not a case in which the current VA equals the current MA, the bootloader continues execution of the remainder of the bootloader initialization via an exception handler following enablement of the MMU and flushing of the TLB. In the second situation, in which the desired VA is a VA that equals the current MA by a chance occurrence, plain execution will result in the remainder of the bootloader initialization continuing via an explicit jump.

In this non-limiting example, the bootloader 106 is initially stored in persistent/non-volatile memory, such as data storage device(s) 102 associated with computing device 100. The bootloader is linked, loaded, and executed on computing device 100.

The bootloader loads and/or configures a hypervisor, OS, or other components into memory 104 on the same computing device 100 to initiate the runtime environment. A hypervisor initiated and/or configured by the bootloader may be any type of hypervisor, such as hypervisor 610 in FIG. 6. In some examples, the hypervisor is an ESXi hypervisor by VMWare, Inc.

In other examples, the computing system shown in FIG. 1 may optionally include one or more other remote computing devices. The one or more remote computing devices may include client(s), server(s), or any other type of computing device accessible via a network. For example, the bootloader 106 may be stored on a data storage located remotely from the computing device 100. The bootloader 106 in this example is transmitted from the remote data storage to the computing device 100 via a network. The network, in some examples, is a Wide Area Network (WAN) accessible to the public, such as the Internet.

In other examples, the bootloader 106 is provided to the computing device 100 via cloud services. Cloud services are provided to clients via the network. The cloud services are optionally provided via one or more physical servers, such as a set of servers associated with a data center. A data center optionally includes one or more physical computing devices, such as servers and/or data storage device(s) in a cluster. The servers may host one or more VCIs.

The cloud services may be provided via a private cloud, a public cloud, or a hybrid cloud. A hybrid cloud is a cloud that includes a public cloud and a private cloud. VMware's vCloud Hybrid Services (vCHS) is an example of a hybrid cloud implementation.

The examples in FIG. 1 have been described in terms of booting up a hypervisor or OS and handing off directly to the hypervisor or OS on completion of the bootloader execution. However, in other examples, the OS kernel hands off directly to the bootloader to perform a reboot operation.

Figure 2:
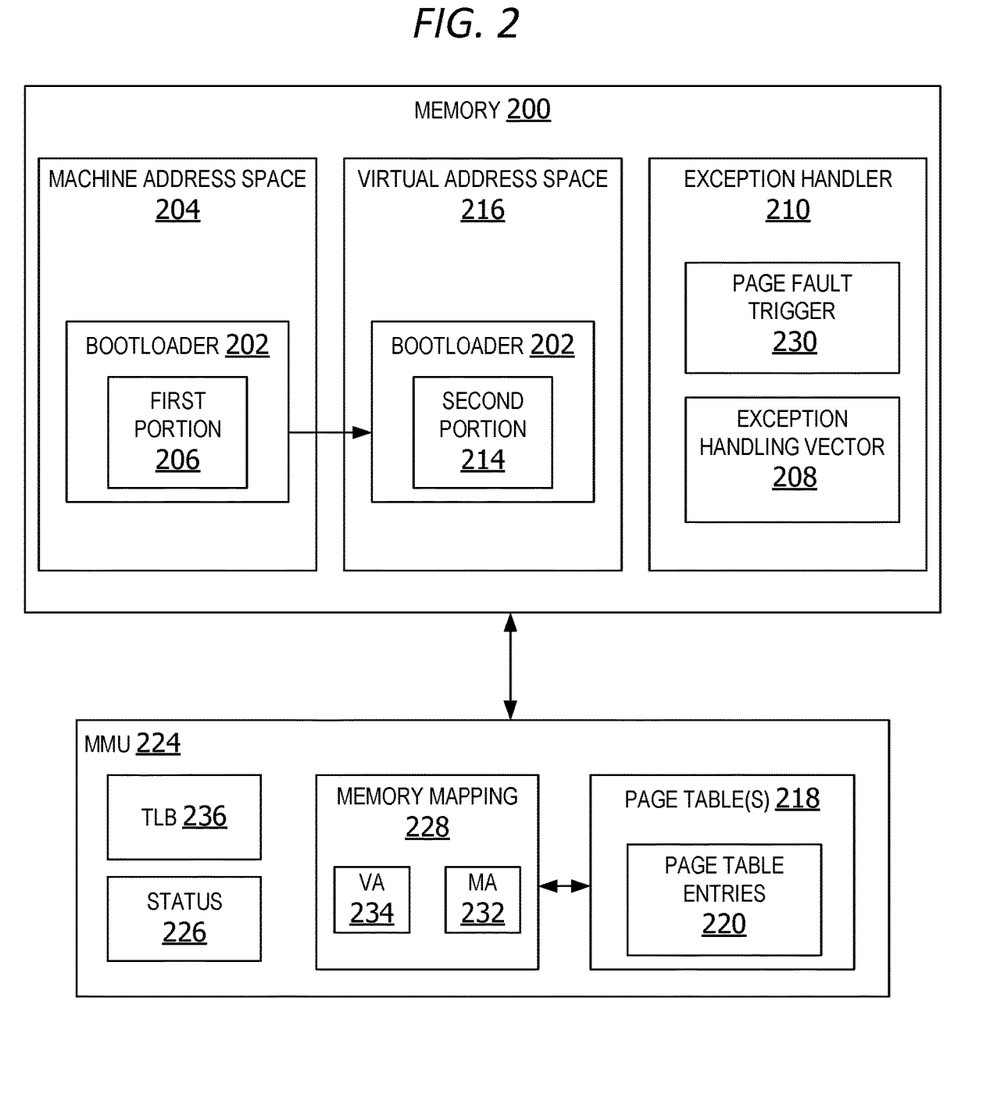
FIG. 2 is an exemplary block diagram illustrating utilization of a page fault handler for constructing bootloader address space.

FIG. 2 is an exemplary block diagram illustrating utilization of a page fault handler for constructing bootloader address space. The memory 200 includes a bootloader 202 running in the MA space 204 at loaded machine addresses.

The bootloader 202 in some non-limiting examples, is an early stage loader for loading a hypervisor. The bootloader 202 includes a first portion 206. The first portion 206 is a low-level language, startup portion of the bootloader. In some non-limiting examples, the first portion 206 is an assembly language portion. The first portion 206 of code switches to running at the expected base VA using a page fault exception.

The first portion 206 of the bootloader sets an exception handling vector 208 of the exception handler 210 to point to one or more MAs associated with the second portion 214 of the bootloader code instead of pointing to address(es) associated with page fault exception handling code. The exception handler 210 may also be referred to as a page fault exception handler. In some non-limiting examples, the first portion 206 of the bootloader code changes the page handler vector to point to the base MA for the second portion of the bootloader code via a special register.

In this example, this exception handling vector 208 register may be labeled. Any label may be utilized, such as, but not limited to, an "mmu_continue" label. In some examples, the exception handling vector 208 may have special alignment requirements. In such cases, the label may be padded if necessary to ensure proper alignment.

In this example, the exception handling vector 208 is mapped in page table(s) 218 such that bootloader execution continues, after the interrupt, at the expected VA address(es) within the virtual address space 216 in virtual memory following resolution of the page fault.

In this example, the bootloader code resumes execution at the expected VA base address at the second portion 214 of the bootloader. The second portion 214 of the bootloader 202 is high-level language (HLL). For example, the second portion 214 may be, without limitation, a C language program or other HLL.

The second portion 214 of the bootloader is a position dependent bootloader. Position dependent code refers to code that is loaded and run at particular memory address(es). When the bootloader is built as a program, at least a portion of the bootloader is linked at an expected base VA. The expected base VA is a certain address where the bootloader will run in the virtual memory address space.

The second portion 214 of the bootloader is linked and run at the expected VA address. In other words, the second portion 214 of the bootloader expects the bootloader to run at an expected base VA. The expected base VA is a predetermined, fixed VA. The expected base VA does not conflict with the constructed kernel address space or address spaces of other data structures.

The first portion 206 of the bootloader 202 defines one or more page table(s) 218. The one or more page table(s) include one or more page table entries 220 mapping the loaded MA to the expected VA. In other words, the page table(s) 218 include page table entries (PTEs) 220 mapping VAs associated with the expected VA for the bootloader in virtual memory to the loaded MA where the bootloader was actually loaded by the firmware.

In some examples, the page table(s) 218 include a mapping from the exception handling vector address to address (es) within the bootloader code. In still other examples, the page tables 218 are modified to indicate the initial portion of the bootloader is unmapped. In some examples, a page table entry corresponding to initial bootloader code indicates the address is unmapped or absent from the page table. This ensures that enabling address translation by the MMU will trigger the page fault.

In this example, the exception handling vector mapping 222 maps the expected base VA address for the bootloader 202 to the loaded MA(s) for the bootloader. In one non-limiting example, the exception handling vector mapping 222 maps the exception handling vector to at least a portion of the bootloader 202 code. In some examples, this is implemented by including a pointer to an address of a bootloader instruction.

In this manner, the exception handler is set to resume execution inside the bootloader within the context of the expected VA linked addresses on occurrence of a page fault trigger.

During execution of the initial portion of the bootloader code, the MMU 224 status 226 is disabled. In a disabled state, the MMU 224 does not perform memory mappings 228. Therefore, the MA 232 is not mapped by a VA 234.

The bootloader 202 enables the MMU. In some examples, the MMU is enabled by changing a register value to "on." The MMU enabled status engages address translation by the MMU.

The bootloader 202 flushes the TLB 236 when the MMU is enabled. The MMU 224 begins memory mapping using the page table(s) 218. The bootloader 202 loaded address(es) are unmapped in the page table(s) 218. Therefore, when the processor attempts to fetch the next sequential instruction, the next sequential instruction is unmapped.

At this point, a page fault occurs if the VA is not equivalent to the MA. A page fault trigger 230 occurs in the MMU environment because execution is occurring in an unmapped address space. The page fault trigger 230 activates the exception handler 210.

The exception handler 210 resumes execution of the bootloader in accordance with the exception handling vector 208 pointing to the expected VA associated with the remaining portion of the bootloader 202. The exception handling switches execution of the bootloader from the MA space 204 to the expected base VA in the VA space 216.

If the VA did equal the MA (VA=MA), execution of the second portion 214 of the bootloader code continues at the expected VA address regardless of whether the MMU is enabled or disabled.

The bootloader 202 optionally removes the mapping of the loaded MA to the expected VA and/or resets the exception handling vector 208 to point back to exception handling code rather than pointing to the expected VA associated with the bootloader. On the next page fault, the exception handler resumes normal exception handling functions. The bootloader completes execution in the VA address space. On completion of bootloader execution, the bootloader transfers operations over to the hypervisor, OS, or other software initialized and/or configured by the bootloader. In some examples, booting is complete when the runtime environment is attained.

Figure 3:
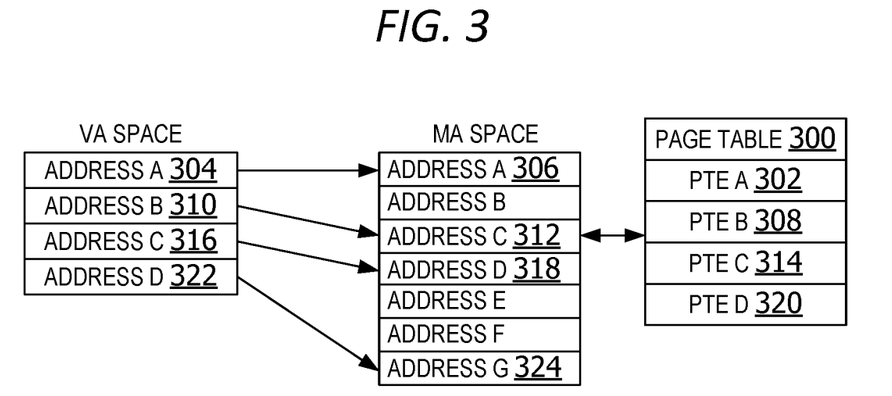
FIG. 3 is an exemplary block diagram illustrating bootloader defined page tables.

FIG. 3 is an exemplary block diagram illustrating bootloader defined page tables. A page table 300 includes one or more PTEs 302 mapping virtual address(es) to machine address(es). In this example, PTE 302 maps a VA in the VA space for instruction "A" 304 to a MA in the MA space for instruction "A" 306. In this example, the letter "A" represents a memory address. The memory address may be any type of memory address. In some examples, a memory address is a frame number and a frame offset.

The MA space in these examples may include contiguous memory or non-contiguous memory. In this example, the MA and VA are equivalent. In other words, the MA identity maps to the VA because the VA maps to the same MA.

PTE 308 maps a VA 310 for instruction "B" to a MA for that instruction. In this example, the VA 310 is not equivalent to the MA 312. In other words, the VA 310 does not identity map to the MA 312. The PTE 314 maps the VA 316 to the MA 318. The PTE 320 maps the VA 322 to the MA 324.

Figure 4:
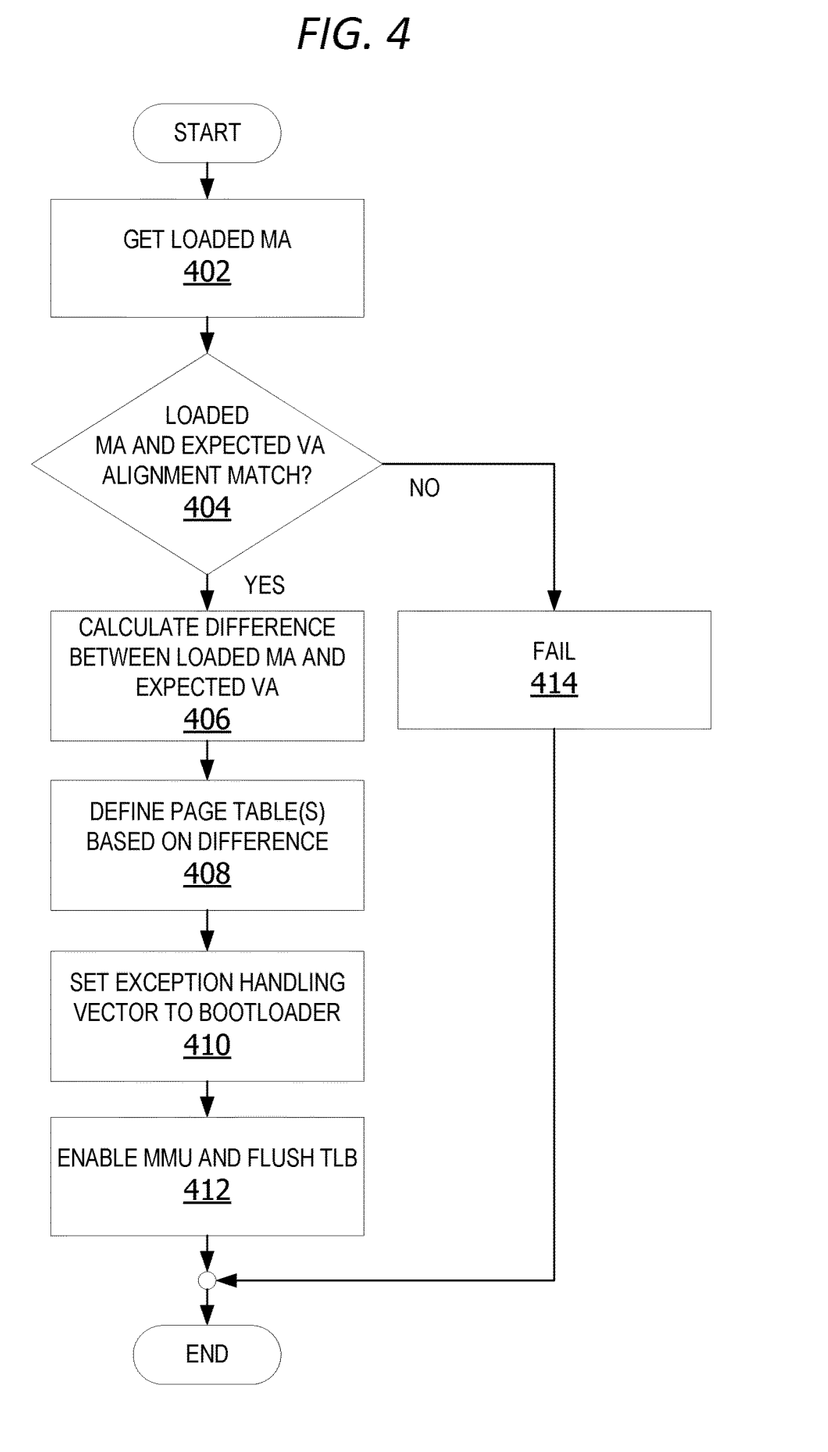
FIG. 4 is an exemplary flow chart illustrating operation of the bootloader to configure a memory management unit.

FIG. 4 is an exemplary flow chart illustrating operation of the bootloader to configure a memory management unit. The process shown in FIG. 4 may be performed by a bootloader executing on a computing device, such as, but not limited to, the bootloader 106 in FIG. 1 and/or the bootloader 202 in FIG. 2. The computing device may be implemented as a computing device such as, but not limited to, the computing device 100 in FIG. 1 and/or the host computing device 600 in FIG. 6. Further, execution of the operations illustrated in FIG. 4 is not limited to a bootloader. One or more computer-readable storage media storing computer-readable instructions may execute to cause at least one processor to implement the operations illustrated in FIG. 4.

The bootloader gets the loaded MA at 402. A determination is made as to whether the loaded MA and expected VA alignment match at 404. If yes, bootloader determines a difference between the loaded MA and the expected VA at 406. The bootloader defines one or more page table(s) based on the difference at 408. The exception handling vector is set to resume execution at the bootloader at 410. The MMU is enabled and the TLB is flushed at 412. The process terminates thereafter.

Returning to 404, if the loaded MA and the expected VA do not have matching alignment, the boot attempt fails at 414. The process terminates thereafter.

The process in FIG. 4 is described as implemented by a bootloader. More specifically, the process in FIG. 4 is implemented by a bootloader running in a machine address space while an MMU is disabled.

While the operations illustrated in FIG. 4 are described as performed by a host computing device or a server, aspects of the disclosure contemplate that performance of the operations by other entities. For example, a cloud service may perform one or more of the operations.

Figure 5:
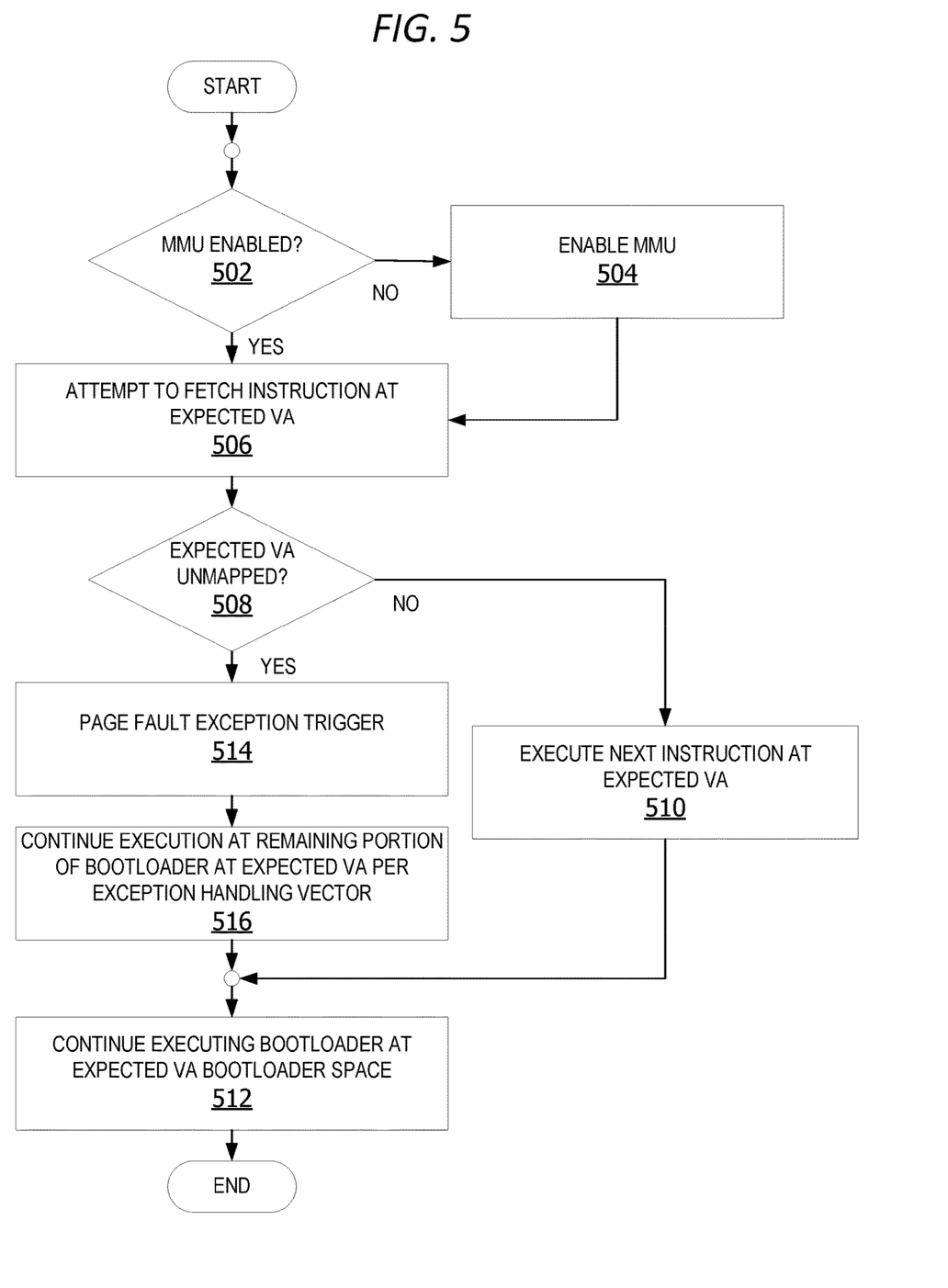
FIG. 5 is an exemplary flow chart illustrating operation of a bootloader to switch execution from machine address space to virtual address space.

FIG. 5 is an exemplary flow chart illustrating operation of a bootloader to switch execution from machine address space to virtual address space. The process shown in FIG. 5 may be performed by a bootloader executing on a computing device, such as, but not limited to, the bootloader 106 in FIG. 1 and/or the bootloader 202 in FIG. 2. The computing device may be implemented as a computing device such as, but not limited to, the computing device 100 in FIG. 1 and/or the host computing device 600 in FIG. 6. Further, execution of the operations illustrated in FIG. 5 is not limited to a bootloader. One or more computer-readable storage media storing computer-readable instructions may execute to cause at least one processor to implement the operations illustrated in FIG. 5.

A determination is made as to whether an MMU is enabled at 502. If no, the MMU is enabled at 504. An attempt is made to an instruction at the next VA at 506. A determination is made as to whether the next VA equals the expected VA at 508. If yes, the next instruction is executed at the expected VA at 510 because the bootloader loaded MA equals the linked VA (load MA=link VA). The bootloader continues executing at the expected VA bootloader space at 512. The procs terminates thereafter.

If the next VA is not equal to the expected VA 508, a page fault exception is triggered at 514 because the bootloader loaded MA does not equal the linked VA (MA !=link VA). The exception handling vector continues execution of the remaining portion of the bootloader at the expected VAs at 516. The bootloader continues executing at the expected VA bootloader space at 512. The process terminates thereafter.

The process in FIG. 5 is described as implemented by a bootloader. More specifically, the process in FIG. 5 is implemented by a bootloader in an MMU enabled state.

While the operations illustrated in FIG. 5 are performed by a host computing device or a server, aspects of the disclosure contemplate performance of the operations by other entities. For example, a cloud service may perform one or more of the operations.

Figure 6:
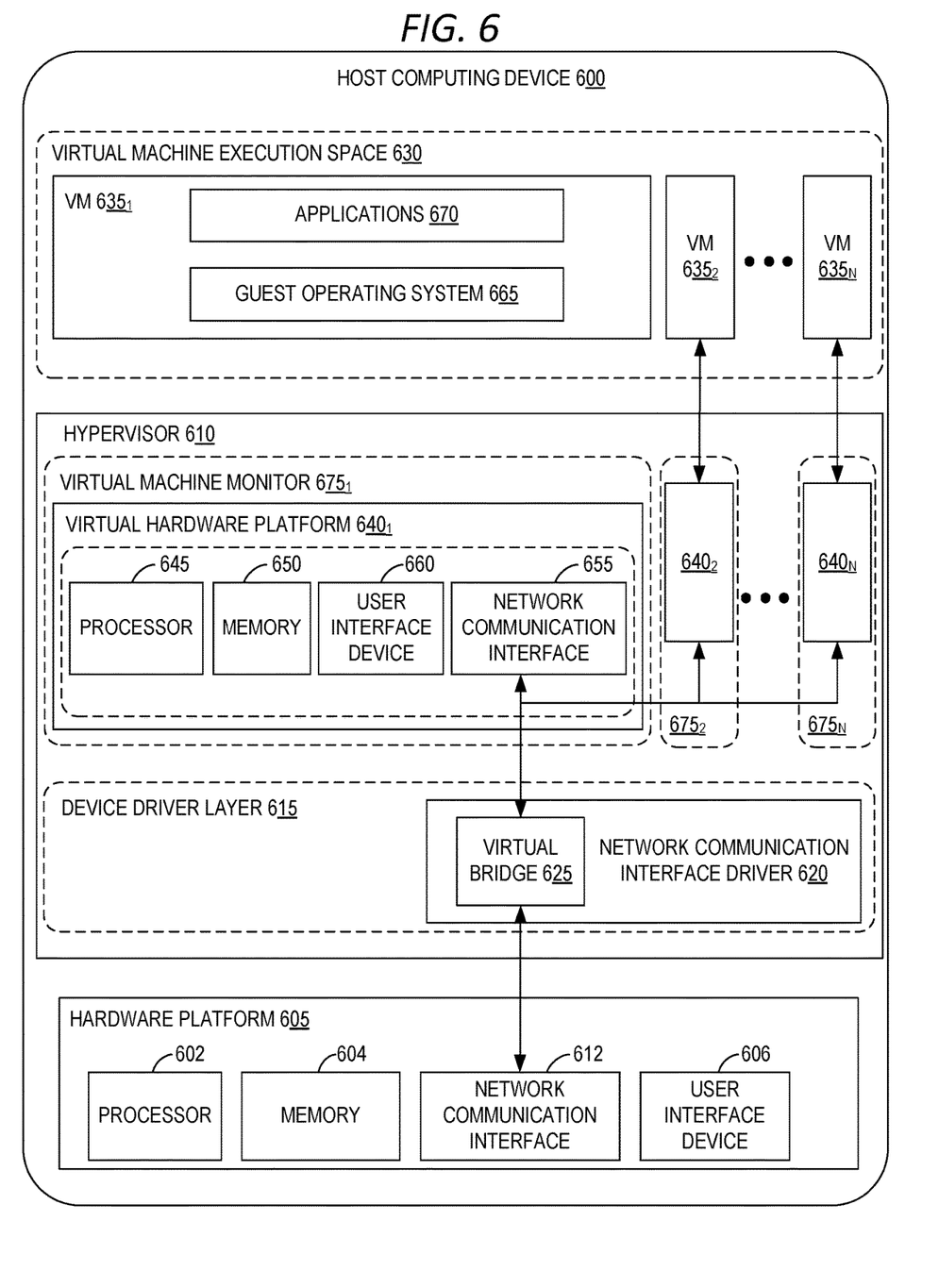
FIG. 6 is a block diagram of VMs instantiated on a host computing device.

FIG. 6 depicts a block diagram of VMs $635_1$, $635_2$ ... $635_N$ that are instantiated on host computing device 600. A VM may be installed as a "guest" on a host hardware platform, such as host computing device 600.

The host computing device 600 in this example includes a hardware platform 605, such as an x86 architecture platform or an ARM 64 platform. The hardware platform 605 may include a processor 602, memory 604, network communication interface 612, user interface device 606, and other input/output (I/O) devices, such as a presentation device 606. A virtualization software layer is installed on top of the hardware platform 605. A single host platform is capable of running multiple VMs.

The virtualization software layer supports a VM execution space 630 within which multiple VMs (VMs $635_1$-$635_N$) may be concurrently instantiated and executed. Hypervisor 610 includes a device driver layer 615, and maps physical resources of the hardware platform 605 (e.g., processor 602, memory 604, network communication interface 612, and/or user interface device 606) to "virtual" resources of each of the VMs $635_1$-$635_N$ such that each of the VMs $635_1$-$635_N$ has its own virtual hardware platform (e.g., a corresponding one of virtual hardware platforms $640_1$-$640_N$), each virtual hardware platform having its own emulated hardware (such as a processor 645, a memory 650, a network communication interface 655, a user interface device 660 and other emulated I/O devices in VM $635_1$).

Hypervisor 610 may manage (e.g., monitor, initiate, and/or terminate) execution of VMs $635_1$-$635_N$ per policies associated with hypervisor 610, such as a policy specifying that VMs $635_1$-$635_N$ are to be automatically respawned upon unexpected termination and/or upon initialization of hypervisor 610. In addition, or alternatively, the hypervisor 610 may manage execution VMs $635_1$-$635_N$ based on requests received from a device other than host computing device 600. For example, the hypervisor 610 may receive an execution instruction specifying the initiation of execution of first VM $635_1$ from a management device via the network communication interface 612 and execute the execution instruction to initiate execution of first VM $635_1$.

In some examples, the memory 650 in the first virtual hardware platform $640_1$ includes a virtual disk that is associated with or "mapped to" one or more virtual disk images stored on a disk (e.g., a hard disk or solid state disk) of the host computing device 600. The virtual disk image represents a file system (e.g., a hierarchy of directories and files) used by the first VM $635_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

The device driver layer 615 includes, for example, a communication interface driver 620 that interacts with the network communication interface 612 to receive and transmit data from, for example, a LAN connected to the host computing device 600. The communication interface driver 620 also includes a virtual bridge 625 that simulates the broadcasting of data packets in a physical network received from one communication interface (e.g., network communication interface 612) to other communication interfaces (e.g., the virtual communication interfaces of VMs $635_1$-$635_N$). Each virtual communication interface for each VM $635_1$-$635_N$, such as the network communication interface 655 for the first VM $635_1$, may be assigned a unique virtual MAC address that enables virtual bridge 625 to simulate the forwarding of incoming data packets from the network communication interface 612. In an example, the network communication interface 612 is an Ethernet adapter that is configured in "promiscuous mode" such that all Ethernet packets that it receives (rather than just Ethernet packets addressed to its own physical MAC address) are passed to virtual bridge 625, which, in turn, forwards the Ethernet packets to VMs $635_1$-$635_N$. This configuration enables an Ethernet packet that has a virtual MAC address as its destination address to properly reach the VM in the host computing device 600 with a virtual communication interface that corresponds to such virtual MAC address.

The virtual hardware platform $640_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 665 to execute applications 670 for an instantiated VM, such as the first VM $635_1$.

Exemplary application(s) include, without limitation, mail application programs, web browsers, calendar application programs, address book application programs, messaging programs, media applications, location-based services, search programs, and the like. The application(s) may communicate with counterpart applications or services such as web services accessible via a network. For example, the applications may represent downloaded client-side applications that correspond to server-side services executing in a cloud.

Some interface is usually required between a VM and the underlying host platform, which is responsible for actually executing VM-issued instructions and transferring data to and from the actual memory and storage devices. A common term for this interface is a virtual machine monitor (VMM). A VMM is usually a thin piece of software that runs directly on top of the host, or directly on the hardware. The VMM virtualizes all the resources of the machine.

The virtual hardware platforms $640_1$-$640_N$ may be part of the VMM $675_1$-$675_N$ that implement virtual system support to coordinate operations between the hypervisor 610 and corresponding VMs $635_1$-$635_N$. Those with ordinary skill in the art will recognize that the various terms, layers, and categorizations used to describe the virtualization components in FIG. 6 may be referred to differently without departing from their functionality or the spirit or scope of the disclosure. For example, the virtual hardware platforms $640_1$-$640_N$ may also be separate from VMs $675_1$-$675_N$, and VMMs $675_1$-$675_N$ may be separate from hypervisor 610. One example of the hypervisor 610 that may be used in an example of the disclosure is included as a component in VMware's ESX brand software, which is commercially available from VMware, Inc.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In some examples, VMs may be used alternatively or in addition to the containers, and hypervisors may be used for the hardware abstraction layer. In these examples. each VM generally includes a guest operating system in which at least one application runs.

For the container examples, it should be noted that the disclosure applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices. In some examples, the computing system environment includes a first computer system at a first site and/or a second computer system at a second site. The first computer system at the first site in some non-limiting examples executes program code, such as computer readable instructions stored on non-transitory computer readable storage medium.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices, network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform tasks or implement abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for constructing bootloader address space. For example, the elements illustrated in FIG. 1, FIG. 2, FIG. 3, and FIG. 6 such as when encoded to perform the operations illustrated in FIG. 4 and FIG. 5 constitute exemplary means for determining a MA at which a bootloader has been loaded into memory; exemplary means for determining a difference between an expected VA and a loaded MA; exemplary means for defining, based on the determined difference, a page table that maps the bootloader loaded at the determined MA to the expected VA; exemplary means for setting an exception handling vector to point to the expected VA associated with the bootloader; exemplary means for enabling the MMU which uses the defined page table for address translation; and exemplary means for executing the bootloader at the expected VA via the exception handling vector in response to a page fault exception resulting from enabling the MMU.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method for constructing bootloader address space, the method comprising:
 initiating, by a bootloader, a loading of an operating system (OS); and
 prior to the OS being loaded, the bootloader performing the following operations:
  determining a machine address (MA) at which the bootloader has been loaded into memory;
  determining a difference between an expected virtual address (VA) and a loaded MA;
  defining, based on the determined difference, a page table that maps the bootloader loaded at the determined MA to the expected VA;
  setting an exception handling vector to point to the expected VA associated with the bootloader;
  enabling a memory management unit (MMU) which uses the defined page table for address translation; and
  in response to a page fault exception resulting from enabling the MMU, executing the bootloader at the expected VA via the exception handling vector.

2. The method of claim 1, further comprising determining that an alignment of the loaded MA of the bootloader matches an alignment of the expected VA prior to defining the page table.

3. The method of claim 1, wherein determining the difference further comprises checking a size criteria associated with the bootloader, wherein execution is continued if the size is less than or equal to an alignment value, and wherein the attempted boot fails if the size of the bootloader exceeds the alignment value.

4. The method of claim 1, further comprising converting a VA of the bootloader to a MA based on the determined difference.

5. The method of claim 1, wherein a first portion of the bootloader executes in a machine address space and further comprising resuming execution of a second portion of the bootloader in a virtual address space following resolution of the page fault exception.

6. The method of claim 1, wherein moving execution of the bootloader from the MA to a bootloader address space associated with the expected VA is performed without moving code for the bootloader in the memory.

7. The method of claim 1, further comprising failing attempted execution of the bootloader on determining an alignment of the loaded MA does not match an alignment of the expected VA associated with the bootloader.

8. A system for constructing bootloader address space, said system comprising:
 at least one memory storing a bootloader and an exception handler, the bootloader comprising a first portion of the bootloader and a position dependent second portion of the bootloader;
 a memory management unit (MMU); and
 at least one processor programmed to execute the bootloader to:
  initiate a loading of an operating system (OS); and
  prior to the OS being loaded, perform the following operations:
   determine a machine address (MA) at which the bootloader has been loaded into memory;
   determine a difference between an expected virtual address (VA) and the loaded MA;
   define, based on the determined difference, a page table that maps the bootloader loaded at the determined MA to the expected VA;
   set an exception handling vector to point to the expected VA associated with the bootloader;
   enable the MMU which uses the defined page table for address translation; and
   in response to a page fault exception resulting from enabling the MMU, execute the bootloader at the expected VA via the exception handling vector.

9. The system of claim 8, wherein the at least one processor is further programmed to execute the bootloader to determine that an alignment of the loaded MA of the bootloader matches an alignment of the expected VA prior to defining the page table.

10. The system of claim 8, wherein the at least one processor is further programmed to check a size criteria associated with the bootloader, wherein execution is continued if the size is less than or equal to an alignment value, and wherein the attempted boot fails if the size of the bootloader exceeds the alignment value.

11. The system of claim 8, wherein the at least one processor is further programmed to convert a VA of the bootloader to a MA based on the determined difference.

12. The system of claim 8, wherein a first portion of the bootloader executes in a machine address space and further comprising:
   a virtual address space, wherein execution of a second portion of the bootloader resumes in a virtual address space following resolution of the page fault exception.

13. The system of claim 8, wherein the at least one processor programmed to fail attempted execution of the bootloader on determining an alignment of the loaded MA does not match an alignment of the expected VA associated with the bootloader.

14. The system of claim 8, wherein the at least one processor programmed to execute the bootloader to flushing a translation lookaside buffer (TLB) upon enabling the MMU to generate the page fault exception.

15. One or more computer storage media embodying computer-executable components, said components comprising:
   a bootloader component having a first portion that is executed to cause at least one processor to initiate a loading of an operating system (OS), and prior to the OS being loaded, perform the following operations:
      determine a machine address (MA) at which the bootloader component has been loaded into memory;
      determine a difference between an expected virtual address (VA) and the loaded MA;
      define a page table that maps the bootloader component loaded at the determined MA to the expected VA based on the determined difference;
      set an exception handling vector to point to the expected VA associated with a second portion of the bootloader component; and
      enable a memory management unit (MMU) which uses the defined page table for address translation; and execute the second portion of the bootloader component at the expected VA via the exception handling vector in response to a page fault exception resulting from enabling the MMU.

16. The computer storage media of claim 15, wherein the bootloader component, upon further execution, causes the at least one processor to determine that an alignment of the loaded MA of the bootloader component matches an alignment of the expected VA prior to defining the page table.

17. The computer storage media of claim 15, wherein the bootloader component, upon further execution, causes the at least one processor to check a size criteria associated with the bootloader component, wherein execution is continued if the size is less than or equal to an alignment value, and wherein the attempted boot fails if the size of the bootloader component exceeds the alignment value.

18. The computer storage media of claim 15, wherein the bootloader component, upon further execution, causes the at least one processor to convert a VA of the bootloader component to a MA based on the determined difference.

19. The computer storage media of claim 15, wherein the bootloader component, upon further execution, causes the at least one processor to execute the first portion of the bootloader in a machine address space and resume execution of the second portion of the bootloader in a virtual address space following resolution of the page fault exception.

20. The computer storage media of claim 15, wherein the bootloader component, upon further execution, causes the at least one processor to fail attempted execution of the bootloader component on determining an alignment of the loaded MA does not match an alignment of the expected VA associated with the bootloader component.

* * * * *